(12) United States Patent
Brodersen

(10) Patent No.: US 9,527,416 B2
(45) Date of Patent: Dec. 27, 2016

(54) VEHICLE SEAT SCISSORS SUSPENSION WITH INTEGRATED STABILIZED ISOLATOR

(75) Inventor: Cole T. Brodersen, Davenport, IA (US)

(73) Assignee: Sears Manufacturing Co., Davenport, IA (US)

( * ) Notice: Subject to any disclaimer, the term of this patent is extended or adjusted under 35 U.S.C. 154(b) by 499 days.

(21) Appl. No.: 13/476,250

(22) Filed: May 21, 2012

(65) Prior Publication Data

US 2013/0306825 A1 Nov. 21, 2013

(51) Int. Cl.

| | |
|---|---|
| *F16M 13/00* | (2006.01) |
| *B60N 2/50* | (2006.01) |
| *F16M 11/00* | (2006.01) |
| *F16M 11/24* | (2006.01) |
| *A47B 91/00* | (2006.01) |
| *A47G 29/00* | (2006.01) |
| *B65D 19/00* | (2006.01) |
| *A47C 7/14* | (2006.01) |
| *F16F 1/00* | (2006.01) |
| *B60N 2/02* | (2006.01) |
| *F16B 7/10* | (2006.01) |

(52) U.S. Cl.
CPC .............. *B60N 2/507* (2013.01); *B60N 2/508* (2013.01); *B60N 2/50* (2013.01); *B60N 2/501* (2013.01); *B60N 2/502* (2013.01); *B60N 2/503* (2013.01); *B60N 2/504* (2013.01); *B60N 2/505* (2013.01); *B60N 2/509* (2013.01); *B60N 2002/0212* (2013.01); *F16B 7/10* (2013.01)

(58) Field of Classification Search
CPC ........... B60N 2/50; B60N 2/502; B60N 2/509; B60N 2/06; B60N 2/062; B60N 2/501; B60N 2/503; B60N 2/504; B60N 2/505; B60N 2/508

USPC .... 248/651, 157, 421, 188.2, 346.06, 354.4, 248/131, 588; 108/20, 21, 147; 297/344.12, 344.15, 344.16, 344.17; 312/319.5, 319.6; 104/145, 245; 296/65.01

See application file for complete search history.

(56) References Cited

U.S. PATENT DOCUMENTS

| | | | | |
|---|---|---|---|---|
| 4,576,357 | A | * | 3/1986 | Schrepfer ...................... 248/662 |
| 4,856,763 | A | * | 8/1989 | Brodersen et al. ........... 267/131 |

(Continued)

OTHER PUBLICATIONS

European Patent Office; Search Report dated Oct. 2, 2013; EU Application No. 13166292.6.

(Continued)

*Primary Examiner* — Brian Mattei
*Assistant Examiner* — Taylor Morris
(74) *Attorney, Agent, or Firm* — Lane & Waterman LLP

(57) ABSTRACT

A vehicle seat suspension comprises a scissors assembly connecting lower and upper housings and permitting vertical movement of the upper housing; reciprocating means; an elongated guide member; and guide engaging rollers. Laterally extending front and rear cross members engage upper ends of the scissor links. The reciprocating means allows the upper housing to move fore and aft, and includes horizontally disposed rollers supported by the scissors assembly and received within side tracks forming part of the upper housing. The guide member is mounted to the upper housing and oriented parallel to the fore and aft travel path. Two vertically disposed guide engaging rollers are mounted to the scissors assembly cross members. The guide engaging rollers cooperate with the guide member at spaced locations to stabilize the upper housing in a direction generally perpendicular to its fore and aft travel path.

7 Claims, 4 Drawing Sheets

(56) References Cited

U.S. PATENT DOCUMENTS

| | | | | |
|---|---|---|---|---|
| 4,941,641 A | * | 7/1990 | Granzow et al. | 248/588 |
| 5,799,922 A | | 9/1998 | Timms et al. | |
| 7,922,142 B2 | | 4/2011 | Koutsky et al. | |
| 2005/0285006 A1 | * | 12/2005 | Koutsky et al. | 248/424 |
| 2008/0296542 A1 | * | 12/2008 | Manev et al. | 254/88 |

OTHER PUBLICATIONS

China Patent Office; Second Office Action dated Feb. 3, 2016; China Application No. 201310176370.6.
China Patent Office; Office Action dated Aug. 5, 2015; China Application No. 201310176370.6.
China Patent Office; Decision of Rejection dated Aug. 26, 2016; China Application No. 201310176370.6.

\* cited by examiner

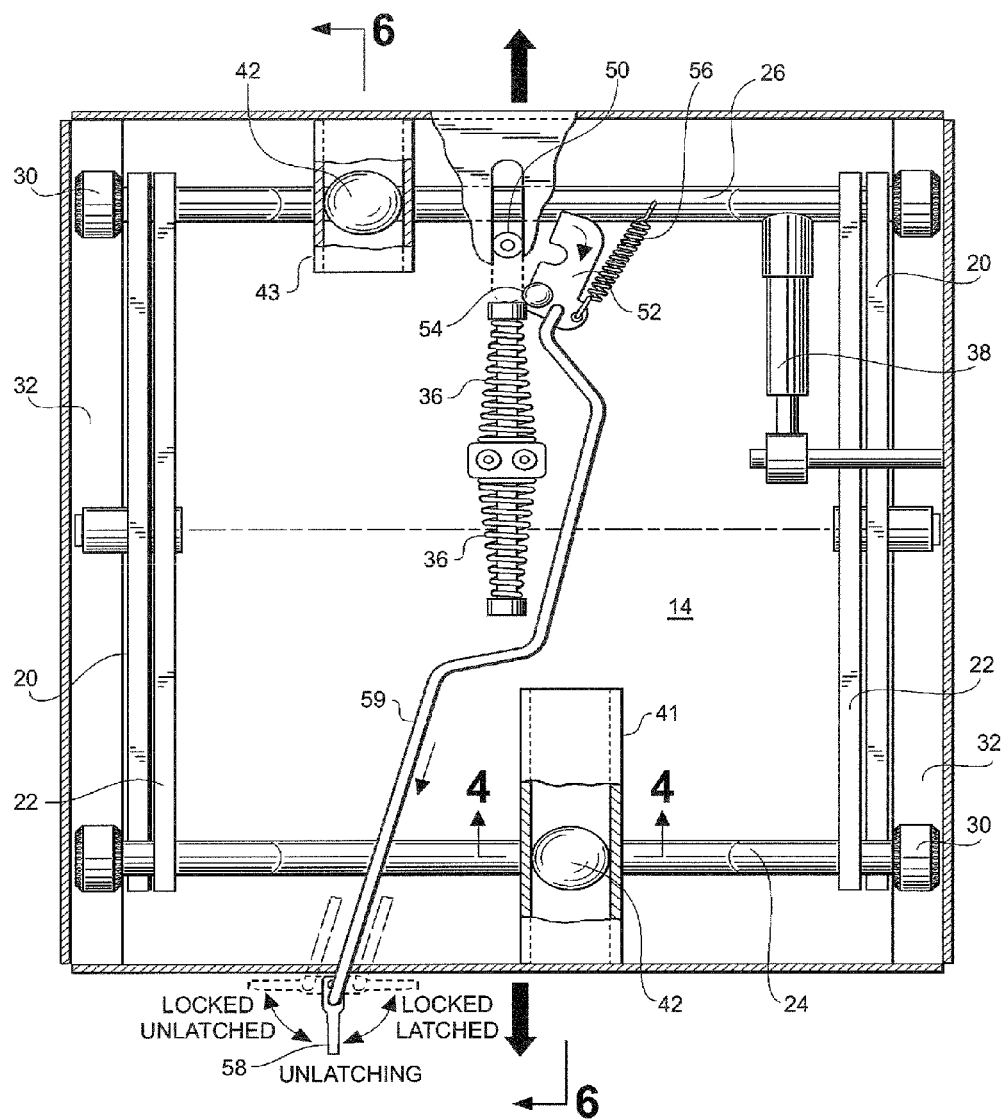

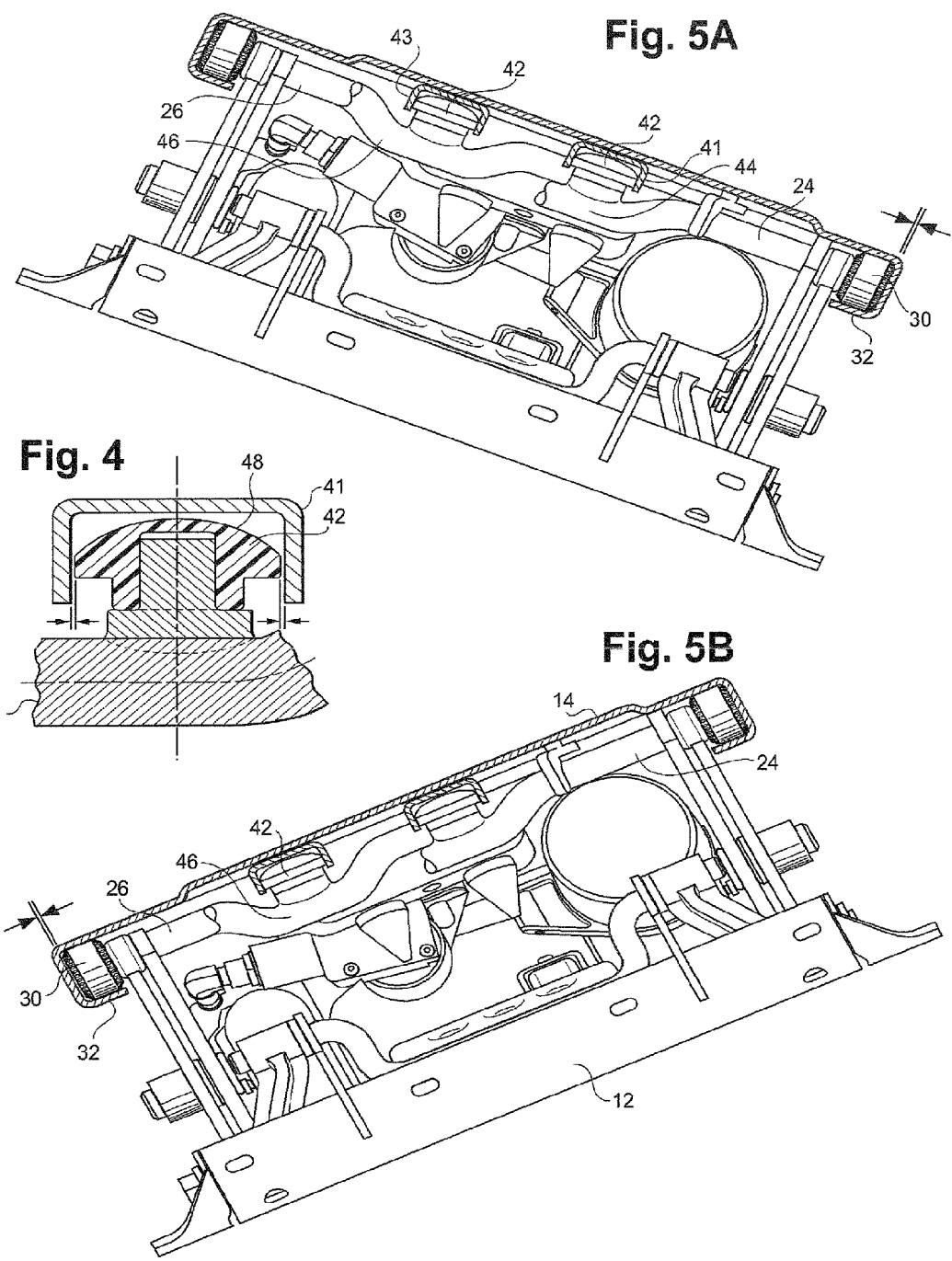

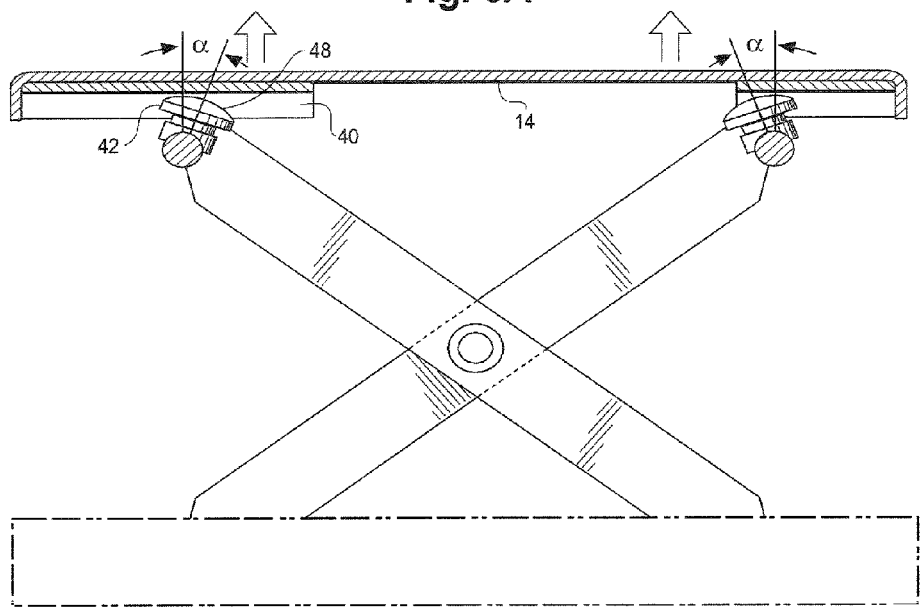
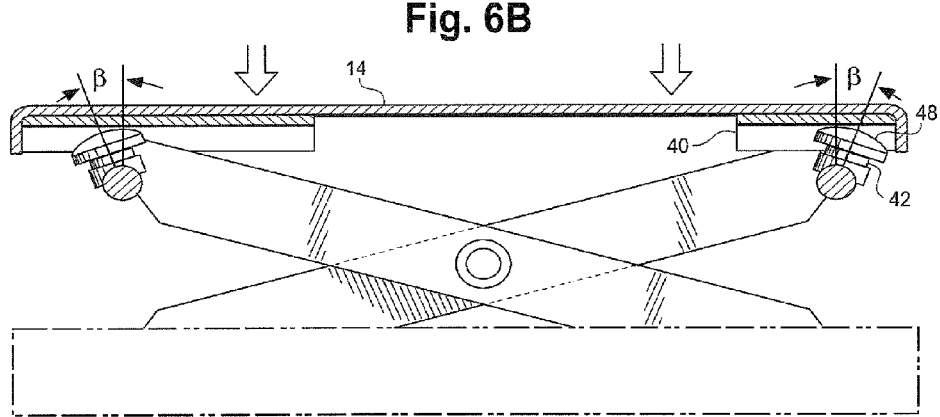

VEHICLE SEAT SCISSORS SUSPENSION WITH INTEGRATED STABILIZED ISOLATOR

BACKGROUND

The present invention is directed generally to vehicle seating. More particularly, the invention is directed to a vehicle seat suspension employing a scissors suspension assembly and having an integrated isolator system that is stabilized to enhance seat suspension performance.

It is now common in vehicle seat technology to provide mechanisms or systems that reduce the undesirable effects of forces inputted to the seat from the front, back or sides. These so called "isolators," both "fore and aft" and "lateral" varieties, commonly have an isolator plate with side tracks that travels in a reciprocal manner on a set of rollers. These conventional isolators, however, suffer from certain disadvantages. Because of dimensional and tolerance constraints, these prior art isolator systems have a tendency to cant or "rack," increasing the interference and friction between the tracks and rollers. In addition, when the vehicle is on uneven terrain, which is often the case with off-the-road vehicles, the isolator tracks may bear against the sides of rollers, again generating undesirable interference and friction. Either or both of these problems can reduce the useful life of the suspension or require repair. Finally, the prior art isolators may cause a perceived "looseness" in the seat ride which is undesirable to the occupant.

Recently, an improved vehicle seat isolator with lateral stabilization has been introduced to the market and is disclosed in U.S. Pat. No. 7,922,142. While the disclosed apparatus is functionally satisfactory, the disclosed scissors suspension assembly and isolator are separate components thereby adding to its cost and space requirements.

SUMMARY OF THE INVENTION

The present invention is directed to a vehicle seat suspension having a stabilized or guided isolator system that overcomes the disadvantages of the prior art. Moreover, the present invention provides enhanced isolator performance in a mechanically simple, reliable and inexpensive design. Importantly, the present invention integrates the isolator function in a scissors suspension assembly so that the overall apparatus is more compact and requires a smaller operational envelope.

In accordance with the present invention, a vehicle seat suspension apparatus is provided comprising a lower housing; an upper housing adapted to support a vehicle seat and having longitudinally extending side tracks; and a scissors linkage assembly connecting the lower and upper housings and permitting vertical movement of the upper housing relative to the lower housing. The scissors linkage assembly includes two pairs of links and laterally extending front and rear cross members engaging upper ends of the links. The apparatus also comprises reciprocating means for allowing the upper housing to move relative to the lower housing along a fore and aft travel path, the reciprocating means includes a plurality of rollers each disposed along a horizontal axis, the rollers being mounted to or supported by the scissors linkage assembly and received within the side tracks of the upper housing; an elongated guide member mounted to the upper housing and oriented generally parallel to the fore and aft travel path; and two guide engaging rollers, each guide engaging roller having a generally vertical axis and being mounted to one of the scissors linkage assembly cross members. The guide engaging rollers cooperating with the guide member at spaced locations to stabilize the upper housing in a direction generally perpendicular to the fore and aft travel path.

BRIEF DESCRIPTION OF THE DRAWINGS

The novel features of the present invention are set forth in the appended claims. However, the invention's preferred embodiments, together with further objects and attendant advantages, will be best understood by reference to the following detailed description taken in connection with the accompanying drawings in which:

FIG. 3 is a cross section view taken along line 3-3 of FIG. 1;

FIG. 4 is a partial cross section taken along line 4-4 of FIG. 3 and illustrating the configuration of a guide roller constructed in accordance with one preferred embodiment of the present invention;

FIGS. 5A and 5B are front elevation views showing the stabilizing function of the present invention when the vehicle seat suspension is positioned on an incline; and FIGS. 6A and 6B are combined partial cross section views and schematics showing the operation of a preferred guide roller embodiment as the seat suspension moves to different height positions.

DETAILED DESCRIPTION OF THE PREFERRED EMBODIMENTS

Figure 1:
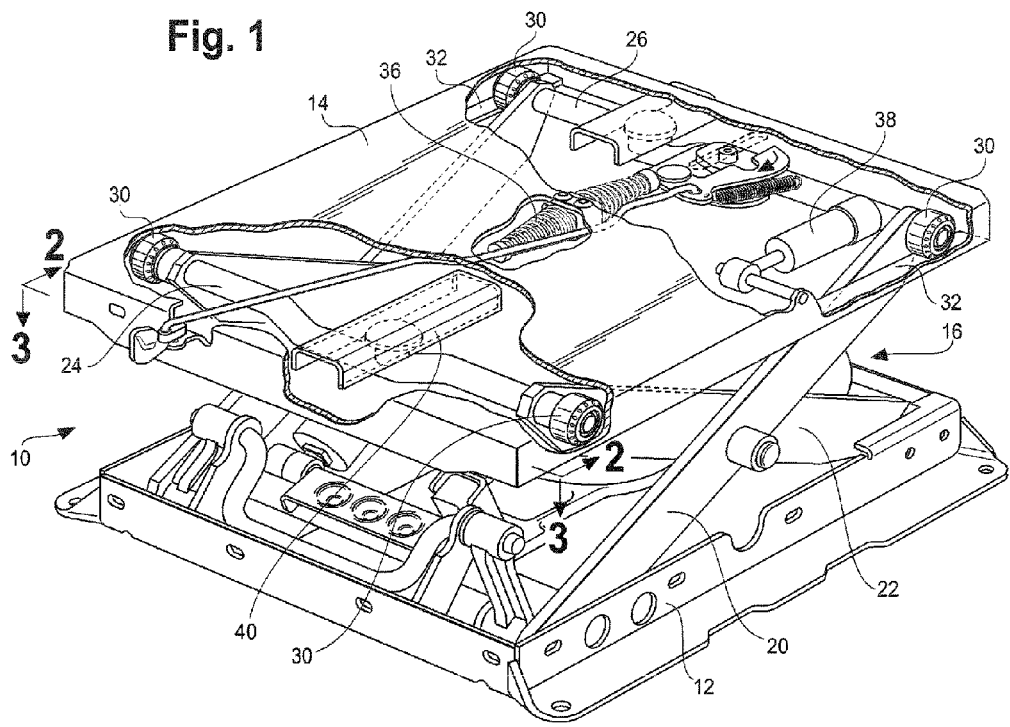
FIG. 1 is a perspective view one preferred embodiment of the present invention with certain parts partially broken away to more clearly illustrate internal components.
Figure 2:
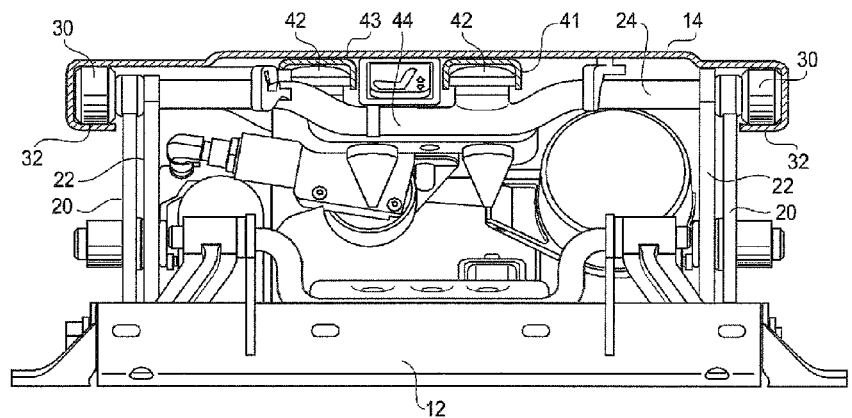
FIG. 2 is a front elevation view of the embodiment of the invention shown in FIG. 1, with parts of the apparatus shown in cross section taken along line 2-2 of FIG. 1.

With reference to FIGS. 1 and 2, the improved seat suspension of the present invention is designated generally as 10, and includes a lower housing or base 12, an upper housing or platform 14 and a scissors linkage assembly 16. The scissors linkage assembly is well known to those of skill in the art and will not be disclosed here in any detail. However, it is generally comprised of two pair of scissors links, each link of the outer pair designated as 20 and each link of the inside pair being designated as 22. In addition, a front cross member or shaft 24 connects the upper ends of the inside links 22, while a rear cross member or shaft 26 connects the upper ends of the outside links 20. Side rollers 30 are positioned adjacent to the upper ends of links 20 and 22 and extend laterally outward from those links along generally horizontal axes of rotation. The upper housing 14 includes longitudinally extending side tracks 32 which house side rollers 30, thereby permitting the upper housing to reciprocate or move back and forth along a fore aft path of travel relative to the lower housing 12. The upper housing 14 is also mechanically connected to the scissors linkage assembly via a pair of springs 36 and a shock absorber 38 in order to provide dampened isolation of the upper housing, and the seat and vehicle operator supported by this housing, from undesirable forces inputted to the seat suspension as the vehicle passes over uneven surfaces. In this manner, in accordance with the preferred embodiment of the invention, the isolator and scissors suspension structures are integrated, providing a more compact and efficient seat suspension assembly.

The aforementioned U.S. Pat. No. 7,922,142 describes a problem which exists with seat isolation devices when the apparatus is subjected to uneven riding conditions. The side loads input to the isolation device may cause premature failure of the rollers employed in the structure or canting of the isolator. The problem may be ameliorated by precise dimensioning of the device and careful fabrication techniques, but these approaches are difficult and costly. In accordance with the present invention and as shown in the preferred embodiments, the side load problem may be minimized, if not entirely eliminated, by use of an elongated guide member or channel 40 mounted to the underside of the upper housing 14 together with a pair of cooperating guide rollers 42 mounted to the cross arms 24 and 26 of the scissors suspension. Preferably, the guide member 40 comprises two channel segments 41 and 43 which extend longitudinally along the underside of the upper housing, but are displaced laterally from one another; that is, the two segments 41 and 43 are positioned at different lateral positions. Since the guide rollers 42 engage the guide member 40 at spaced longitudinal locations, this arrangement stabilizes the upper housing in a direction generally perpendicular to its fore aft path of travel. This, in turn, reduces premature wear of the side rollers 30 and minimizes the potential for canting of the isolator. This is illustrated in FIGS. 5A and 5B which show the slight spacing between the inside of the tracks 32 and the outside of the guide rollers 30, even when the seat suspension is positioned at a relatively severe side angle.

As most clearly illustrated in FIGS. 4, 5A and 5B, 6A and 6B, the cross arms 24 and 26 include intermediate offset portions 44 and 46, respectively, and the guide rollers 42 are mounted to these offset portions with a generally vertical axis of rotation. However, as the scissors suspension moves the upper housing vertically, the cross arms 24 and 26 rotate through a small arc and this, in turn, causes the rollers 42 to move from a true vertical position, inclining slightly toward either the front or rear of the assembly. This is illustrated in FIGS. 6A and 6B. To accommodate this inclination of the rollers 42, each is configured with a generally convex upper external surface 48. Also, the offset of the cross arms 24 and 26 allow the rollers 42, throughout the arc of their travel, to be positioned in about the same horizontal plane as side rollers 30 as the scissors suspension moves.

FIG. 3 illustrates a simple lockout device which may be used to deactivate the isolator function. The lockout device includes a lock pin 50 mounted in fixed position relative to rear cross arm 26, and a pivotable latch mechanism 52 mounted to the underside of the upper housing. Latch mechanism 52 pivots about pivot pin 54 and has a biasing spring 56 which urges the latch toward engagement with lock pin 50. An actuation lever 58 acts on link 59 to move the latch 52 to one of either the engaged or disengaged positions.

It will be appreciated by those skilled in the art that various changes and modifications can be made to the illustrated embodiments without departing from the spirit of the present invention. All such modifications and changes are intended to be covered by the appended claims.

The invention claimed is:

1. A vehicle seat suspension apparatus comprising:
   a lower housing;
   an upper housing adapted to support a vehicle seat and having longitudinally extending side tracks;
   a scissors linkage assembly connecting the lower and upper housings and permitting vertical movement of the upper housing relative to the housing, said scissors linkage assembly including two pairs of links and laterally extending front and rear cross members connecting upper ends of the links;
   reciprocating means for allowing the upper housing to move relative to the lower housing along a fore and aft travel path, said reciprocating means including a plurality of side rollers each disposed along a horizontal axis, said side rollers being mounted to or supported by the scissors linkage assembly and received within the side tracks of the upper housing;
   an elongated guide member mounted to the upper housing and oriented generally parallel to the fore and aft travel path; and
   two guide engaging rollers, each guide engaging roller having a generally vertical axis of rotation and being mounted to one of the scissors linkage assembly cross members, and said guide engaging rollers cooperating with the guide member at spaced locations to stabilize the upper housing in a direction generally perpendicular to the fore and aft travel path.

2. The vehicle seat suspension apparatus of claim 1 wherein each of the cross members includes an intermediate offset and each of the guide engaging rollers is mounted to one of the cross member offsets.

3. The vehicle seat suspension apparatus of claim 1 wherein each of the guide engaging rollers includes a generally convex upper surface to accommodate angular displacement of its respective axis of rotation as the scissors linkage assembly moves the upper housing vertically.

4. The vehicle seat suspension apparatus of claim 1 wherein each of said side rollers is located adjacent to and extends laterally outward from an upper end of one of said scissors links.

5. The vehicle seat suspension apparatus of claim 1 wherein said elongated guide member comprises two channels, each of the channels being mounted to the underside of the upper housing.

6. The vehicle seat suspension apparatus of claim 5 wherein the two channels comprising the elongated guide member are positioned at different lateral locations on the upper housing.

7. The vehicle seat suspension apparatus of claim 1 wherein the two guide engaging rollers are positioned in generally the same horizontal plane as the plurality of side rollers.

\* \* \* \* \*